United States Patent
Quadakkers et al.

(10) Patent No.: US 7,338,719 B2
(45) Date of Patent: Mar. 4, 2008

(54) MCRAL LAYER

(75) Inventors: Willem J. Quadakkers, Wiinandsrade (NL); Werner Stamm, Mülheim (DE)

(73) Assignees: Siemens Aktiengesellschaft, Munich (DE); Forschungszentrum Julich GmbH, Julich (DE)

( * ) Notice: Subject to any disclaimer, the term of this patent is extended or adjusted under 35 U.S.C. 154(b) by 70 days.

(21) Appl. No.: 10/516,095

(22) PCT Filed: May 21, 2003

(86) PCT No.: PCT/EP03/05337

§ 371 (c)(1),
(2), (4) Date: Nov. 24, 2004

(87) PCT Pub. No.: WO03/100133

PCT Pub. Date: Dec. 4, 2003

(65) Prior Publication Data

US 2005/0164026 A1    Jul. 28, 2005

(30) Foreign Application Priority Data

May 24, 2002  (EP)  .................................. 02011461

(51) Int. Cl.
*B32B 3/00* (2006.01)
*B32B 15/04* (2006.01)
(52) U.S. Cl. ................ 428/680; 427/383.1; 427/383.7; 148/285
(58) Field of Classification Search ................ 428/680; 148/285; 427/383.1, 383.7
See application file for complete search history.

(56) References Cited

U.S. PATENT DOCUMENTS

| 4,676,994 A | * | 6/1987 | Demaray ..................... 427/566 |
| 4,774,149 A | | 9/1988 | Fishman |
| 5,077,140 A | * | 12/1991 | Luthra et al. ............... 428/660 |
| 5,141,821 A | | 8/1992 | Lugscheider et al. |
| 5,316,866 A | | 5/1994 | Goldman et al. |
| 5,652,028 A | | 7/1997 | Taylor et al. |
| 5,741,556 A | | 4/1998 | Taylor et al. |
| 5,780,171 A | | 7/1998 | Nissley et al. |
| 5,981,091 A | | 11/1999 | Rickerby et al. |
| 6,165,628 A | | 12/2000 | Borom et al. |

FOREIGN PATENT DOCUMENTS

| EP | 0 532 150 A1 | 3/1993 |
| GB | 1 397 066 | 6/1975 |
| GB | 2 243 161 A | 10/1991 |
| WO | WO 99/23270 | 5/1999 |
| WO | WO 99/23277 | 5/1999 |

\* cited by examiner

*Primary Examiner*—John J. Zimmerman
*Assistant Examiner*—Aaron Austin

(57) ABSTRACT

MCrAl layers according to prior art often display chipping of the thermally grown aluminum oxide layer (TGO) as a result of thermally induced stresses, which significantly reduces the oxidation behavior or the bonding behavior of ceramic heat insulating layers. An inventive MCrAl layer is designed in such a way that the TGO created thereon is microporous and thus allows expansion. The microporosity of the TGO is ensured by adding elements into the MCrAl layer in a targeted manner.

12 Claims, No Drawings

MCRAL LAYER

CROSS REFERENCE TO RELATED APPLICATION

This application is the US National Stage of International Application No. PCT/EP03/05337, filed May 21, 2003 and claims the benefit thereof. The International Application claims the benefits of European application No. 02011461.7 EP May 24, 2002, both of the applications are incorporated by reference herein in their entirety.

FIELD OF THE INVENTION

The invention relates to an MCrAl layer for components which are exposed to high thermal loads, in particular for a turbine blade or vane, especially for a gas turbine.

BACKGROUND OF THE INVENTION

Metallic components which are used at high temperatures must in many fields of engineering be protected from the oxidizing, corrosive and/or degrading attack of the operating atmosphere by means of layer systems. In the field of gas turbines, i.e. aircraft engines and stationary industrial gas turbines, it has for many years been standard practice to protect the high-temperature components from degradation by the application of layers of the MCrAl (M=Fe, Co, Ni) or β-NiAl type.

The MCrAl layers are usually applied to the metallic high-temperature component by means of vacuum or air plasma spraying.

The β-NiAl layers are applied using alitizing processes.

Depending on the particular component and the operating conditions, these types of protective layers are used both purely to protect against oxidation and corrosion and also in the form of bonding layers for ceramic thermal barrier coatings, for example based on zirconium oxide.

In both the abovementioned applications, the protective action of the layer systems is based on an aluminum oxide layer which forms on these layers at the high operating temperatures. To achieve a low growth rate and bonding of the aluminum oxide layer, the MCrAl and β-NiAl layers usually contain small quantities of elements which have an affinity for oxygen, in particular yttrium.

The aluminum content in the layer system must be sufficiently high to ensure the formation of aluminum oxide even during long-term use. In the case of β-NiAl layers, it is customary for the aluminum content to be approximately 25-30% by weight, whereas the MCrAl layers contain approximately 8-14% by weight of aluminum. The MCrAl layers have the advantage over the β-NiAl layers of being less brittle and, moreover, more resistant to corrosion in sulfur-containing operating gases.

It has been found on the basis of laboratory tests and operating experience that the long-term properties and the protective function of the MCrAl layers are crucially determined by the bonding of the thermally grown oxide (TGO) layer based on aluminum oxide which is formed on the surfaces at the high operating temperatures. This is true not only when the MCrAl layers are used to protect a metallic component against oxidation and corrosion but also in particular if they are used as a bonding layer for ceramic thermal barrier coatings.

The problems with the bonding of the TGO are based predominantly on the fact that thermally induced stresses, which are attributable to the differences in the coefficient of thermal expansion between the MCrAl layer and the TGO based on aluminum oxide, occur in and near the TGO during cooling of the MCrAl-coated component. If growth-induced cracks are formed in the vicinity of the interface between TGO and MCrAl during long-term use, the thermally induced stresses will lead to flaking of the TGO.

If the MCrAl material is used purely as a layer to protect a metallic component against oxidation and corrosion, the regular flaking of the TGO and the subsequent formation of a new oxide layer leads to accelerated consumption of the element aluminum which forms the covering layer and therefore shortens the service life of the MCrAl layer.

If the MCrAl layer is used as a bonding layer for ceramic thermal barrier coatings, flaking of the TGO will immediately give rise to flaking and therefore catastrophic failure of the thermal barrier coating.

Hitherto, it has been attempted to achieve a layer structure with a good toothed engagement with the ceramic by platinizing over the MCrAl layer with low aluminum contents of approximately 8% by weight. However, this means applying a further layer.

U.S. Pat. No. 5,741,556 shows an MCrAl layer with yttrium in which nitrogen is used as an inert gas during production of the layer.

U.S. Pat. No. 5,981,091 shows an MCrAl layer which may contain hafnium, yttrium, carbon and nitrogen. In this thermal barrier coating system, however, a platinum-enriched layer is applied to the MCrAl layer.

U.S. Pat. No. 4,774,149 discloses an MCrAl layer with hafnium, yttrium and a nitrogen content in the powder which, however, is undesirable and is to be reduced to a minimum.

U.S. Pat. No. 5,780,171 discloses an MCrAl layer comprising hafnium and yttrium, nitrogen being used as carrier gas during production of the layer.

U.S. Pat. No. 5,652,028 discloses an MCrAl layer of composition NiCoCrAl.

WO 99/23270 discloses an MCrAl layer to which lanthanum and hafnium are added.

GB 2 243 161 A discloses an MCrAl layer with additions of zirconium, silicon, tantalum, hafnium, yttrium, scandium or lanthanum.

U.S. Pat. No. 5,141,821 discloses an MCrAl layer with included particles of carbides in order to improve the abrasion properties of the layer. Furthermore, the MCrAl layer may contain zirconium, hafnium and tantalum.

SUMMARY OF THE INVENTION

Therefore, it is an object of the invention to provide an MCrAl layer in which the aluminum oxide layer does not flake off or does so to only a slight extent.

This object is achieved by an MCrAl layer in accordance with the patent claims.

The subclaims list further advantageous configurations of an MCrAl layer.

The invention is based on the discovery that good bonding of the TGO to the MCrAl layer is positively influenced by a microporosity of the TGO.

The pores which are present in the TGO should have a diameter of from 10 to 500 nm. The distances between the pores are in this case from 30 to 600 nm, the distance between the pores increasing as the pore size increases.

The positive effect of the microporosity is based on the fact that the thermal stresses which occur during cooling can be absorbed by expansion occurring in the micro-range in the aluminum oxide layer. This is not possible in high-density TGOs, since even very slight expansion leads to catastrophic crack growth and therefore to flaking of the TGO.

Microporous TGOs are therefore more tolerant to expansion and more suitable for absorbing thermally induced stresses than high-density TGOs.

DETAILED DESCRIPTION OF THE INVENTION

The MCrAl layer used by way of example is an NiCoCrAl layer and has concentrations of the main alloying elements in accordance with the prior art:

10 to 82% by weight of cobalt,
10 to 35% by weight of chromium,
8 to 14% by weight of aluminum, remainder nickel with further optional alloying additions. Examples of alloying additions of this type for this composition or also other compositions include silicon (up to 2% by weight), rhenium (0.3 to 5% by weight) and tantalum (up to 8% by weight).

To achieve a microporosity in TGOs in a preferred way, the MCrAl layer must absolutely also include the following additions of at least one element from each of groups I, II and III:

Group I: at least one element with an affinity for oxygen, i.e. elements which form very thermodynamically stable oxides, selected from the group consisting of yttrium, cerium, scandium, lanthanum or other lanthanides. The total concentration of these elements is in the range from 0.02 to 1% by weight, preferably between 0.05 and 0.5% by weight.

Group II: at least one element selected from the group consisting of hafnium, zirconium and titanium, since these elements form very thermodynamically stable compounds with nitrogen and carbon (nitrides and carbides);

the total concentration of these elements is in the range from 0.02 to 1% by weight, preferably 0.05 to 0.3% by weight.

Group III: carbon and/or nitrogen, the total concentration of carbon and nitrogen being from 0.005 to 0.2% by weight, preferably from 0.01 to 0.1% by weight.

The result of this obligatory combination of elements from the three groups listed above for this exemplary embodiment is as follows: the addition of one or more elements from group I greatly improves the bonding of the aluminum oxide layer to the MCrAl layer in accordance with the prior art.

The elements from group II are likewise elements with a high affinity for oxygen, but simultaneously form very stable nitrides and carbides. Since the MCrAl layer contains additions of elements of both group I and group II, the elements of group I will be preferentially oxidized. The elements of group II will preferentially react with the carbon and/or nitrogen present in the MCrAlY layer so as to form fine precipitations of carbides and/or nitrides.

If the elements of group I were not fully added, the elements of group II would preferentially react with oxygen, since the corresponding oxides of the elements have a higher thermodynamic stability than the corresponding carbides, nitrides or carbonitrides. The elements from group II would be consumed by this oxide formation, and therefore carbides and nitrides would not be formed.

Since the MCrAl layer contains the abovementioned additions from all three groups, the elements of group II will form fine precipitations with a typical diameter of from 10 to 900 nm with the carbon and/or nitrogen, in the form of carbides, nitrides and/or carbonitrides, during use at high temperatures or a prior heat treatment.

In the case of a deliberate preliminary oxidation process, i.e. before the MCrAl bonding layer is coated with a ceramic thermal barrier coating, the fine precipitations which are in the vicinity of the surface of the MCrAl layer are enclosed by the aluminum oxide layer growing inward. During further growth of the layer, the enclosed carbides and/or nitrides or carbonitrides will be oxidized on account of the locally increasing oxygen partial pressure.

This is associated with a change in volume and the release of gases. These two processes lead to the formation of very fine pores with a diameter of from 10 to 800 nm and microcracks with a length of from 10 to 600 m in the aluminum oxide layer (TGO).

This results in the formation of a desired expansion-tolerant aluminum oxide layer with a microporosity on the surface of the MCrAl layer.

The invention claimed is:

1. An MCrAl layer for a turbine blade or vane comprising a microporous aluminum oxide layer arranged on the MCrAl layer, wherein M is selected from the group consisting of: Fe, Co, and Ni:

wherein the MCrAl layer includes at least one element selected from a first group consisting of yttrium, cerium, scandium, lanthanum, and other lanthanides having a total concentration of the first group elements in the range from 0.02% to 1% by weight; and at least one element selected from a second group consisting of hafnium, zirconium, and titanium having a total concentration of the second group elements in the range from 0.02% to 1% by weight;

and at least one element selected from a third group consisting of carbon and nitrogen having a total concentration of the third group elements in the range from 0.005% to 0.2% by weight;

wherein the microporous aluminum oxide layer contains pores having diameters in the range of 10-800 nanometers.

2. The MCrAl layer as claimed in claim 1, wherein the total concentration of the first group elements is in the range from 0.05% to 0.5% by weight.

3. The MCrAl layer as claimed in claim 1, wherein the total concentration of the second group elements is in the range from 0.05% to 0.3% by weight.

4. The MCrAl layer as claimed in claim 1, wherein the total concentration of the third group elements is in the range from 0.01% to 0.1% by weight.

5. The MCrAl layer as claimed in claim 1, wherein the MCrAl layer is an NiCoCrAl layer.

6. The MCrAl layer as claimed in claim 1, wherein the MCrAl layer has the following composition:

10 to 82% by weight of cobalt,
10 to 35% by weight of chromium,
8 to 14% by weight of aluminum, and
nickel as the balance.

7. The MCrAl layer as claimed in claim 1, wherein the MCrAl layer is further comprised of a alloying addition.

8. The MCrAl layer as claimed in claim 7, wherein the MCrAl layer includes from 0.3 to 5% by weight of rhenium as the further alloying addition.

9. The MCrAl layer as claimed in claim 1, wherein a ceramic thermal barrier coating is arranged on the MCrAl layer.

10. The MCrAl layer as claimed in claim 1, wherein the microporous aluminum oxide layer contains pores having diameters in the range of 10-500 nanometers.

11. A process for producing a protective layer, the process comprising:

depositing a layer of MCrAl material comprising: at least one of the group of yttrium, cerium, scandium, lanthanum and other lanthanides; at least one of the group of hafnium, zirconium and titanium; and at least one of the group of carbon and nitrogen;

further comprising depositing the layer of MCrAl material to comprise: 0.02 to 1% by weight of at least one of the group of yttrium, cerium, scandium, lanthanum and other lanthanides: 0.02 to 1% by weight of at least one of the group of hafnium, zirconium and titanium; and 0.005 to 0.2% by weight of at least one of the group of carbon and nitrogen;

exposing the layer of MCrAl material to a temperature sufficiently high to form at least one of the group of carbide, nitride and carbonitride precipitations;

enclosing at least a portion of the precipitations proximate a surface of the layer of MCrAl material in an aluminum oxide layer growing inwardly from the surface; and oxidizing the enclosed precipitations to affect a change in volume and a release of gas to form a plurality of pores comprising diameters in the range of 10-500 nanometers in the aluminum oxide layer.

12. A protective coating for a component, the coating comprising:

a layer of MCrAl material comprising: at least one of the group of yttrium, cerium, scandium, lanthanum and other lanthanides; at least one of the group of hafnium, zirconium and titanium; and at least one of the group of carbon and nitrogen;

precipitations of at least one of the group of carbide, nitride and carbonitride formed within the layer of MCrAl;

an aluminum oxide layer grown inwardly from a surface of the layer of MCrAl;

oxides of at least a portion of the precipitations within the aluminum oxide layer; and a plurality of pores with diameters of 10-800 nm and microcracks with lengths of 10-600 nm in the aluminum oxide layer resulting from a change in volume and a release of gas occurring during formation of the oxides of the precipitations;

the MCrAl material comprising a NiCoCrAl material comprising: 0.02 to 1% by weight of at least one of the group of yttrium, cerium, scandium, lanthanum and other lanthanides: 0.02 to 1% by weight of at least one of the group of hafnium, zirconium and titanium: and 0.005 to 0.2% by weight of at least one of the group of carbon and nitrogen; and the pores comprising a diameter of 10-800 nm and the microcracks comprising a length of 10-600 nm.

* * * * *